(12) United States Patent
Riedisser et al.

(10) Patent No.: US 11,746,851 B2
(45) Date of Patent: Sep. 5, 2023

(54) DAMPER ARRANGEMENT AND TRANSMISSION FOR A MOTOR VEHICLE DRIVE TRAIN

(71) Applicant: ZF Friedrichshafen AG, Friedrichshafen (DE)

(72) Inventors: Thomas Riedisser, Sigmarszell (DE); Tamas Gyarmati, Bermatingen (DE); Derk Langenkaemper, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 301 days.

(21) Appl. No.: 17/243,724

(22) Filed: Apr. 29, 2021

(65) Prior Publication Data

US 2021/0341034 A1 Nov. 4, 2021

(30) Foreign Application Priority Data

Apr. 30, 2020 (DE) ...................... 10 2020 205 466.5

(51) Int. Cl.
| | |
|---|---|
| *H02K 7/00* | (2006.01) |
| *F16F 15/16* | (2006.01) |
| *F16F 9/12* | (2006.01) |
| *H02K 5/15* | (2006.01) |
| *H02K 5/24* | (2006.01) |
| *B60K 6/20* | (2007.10) |

(52) U.S. Cl.
CPC .............. *F16F 15/162* (2013.01); *F16F 9/12* (2013.01); *H02K 5/15* (2013.01); *H02K 5/24* (2013.01); *H02K 7/006* (2013.01); *B60K 6/20* (2013.01); *B60Y 2200/92* (2013.01); *F16F 2222/12* (2013.01); *F16F 2232/02* (2013.01); *F16F 2236/08* (2013.01)

(58) Field of Classification Search
CPC .. B60K 6/20; B60Y 2200/92; H02K 2213/03; H02K 5/15; H02K 5/24; H02K 7/003; H02K 7/006; H02K 7/116; H02K 9/19; F16F 15/145; F16F 15/162; F16F 2222/12; F16F 2232/02; F16F 2236/08; F16F 9/12

See application file for complete search history.

(56) References Cited

U.S. PATENT DOCUMENTS

| | | | |
|---|---|---|---|
| 2019/0186552 A1* | 6/2019 | Schmidt | .................. F16D 13/38 |
| 2019/0195312 A1* | 6/2019 | Führer | .............. F16F 15/12353 |
| 2020/0056677 A1* | 2/2020 | Schmidt | .................. F16F 15/16 |

FOREIGN PATENT DOCUMENTS

| | | |
|---|---|---|
| DE | 316877 A | 12/1919 |
| DE | 112014005842 T5 | 9/2016 |
| DE | 102018210451 A1 * | 1/2020 |
| DE | 102018210451 A1 | 1/2020 |

OTHER PUBLICATIONS

DE-102018210451-A1, Mitterauer T, all pages (Year: 2020).*
German Search Report DE 10 2020 205 466.5, dated Nov. 27, 2020. (10 pages).

* cited by examiner

*Primary Examiner* — Naishadh N Desai
(74) *Attorney, Agent, or Firm* — Dority & Manning, P.A.

(57) ABSTRACT

A damper arrangement for a motor vehicle drive train includes a damper (120) for damping torsional vibrations and a rotationally fixed fluid guide element (110). The fluid guide element (110) is axially adjacent to the damper (120). The damper (120) has at least one duct (112-1, 112-2, 112-3). A fluid (140) that at least partially surrounds the damper (120) is conveyed through the at least one duct (112-1, 112-2, 112-3) when the damper (120) rotates.

19 Claims, 12 Drawing Sheets

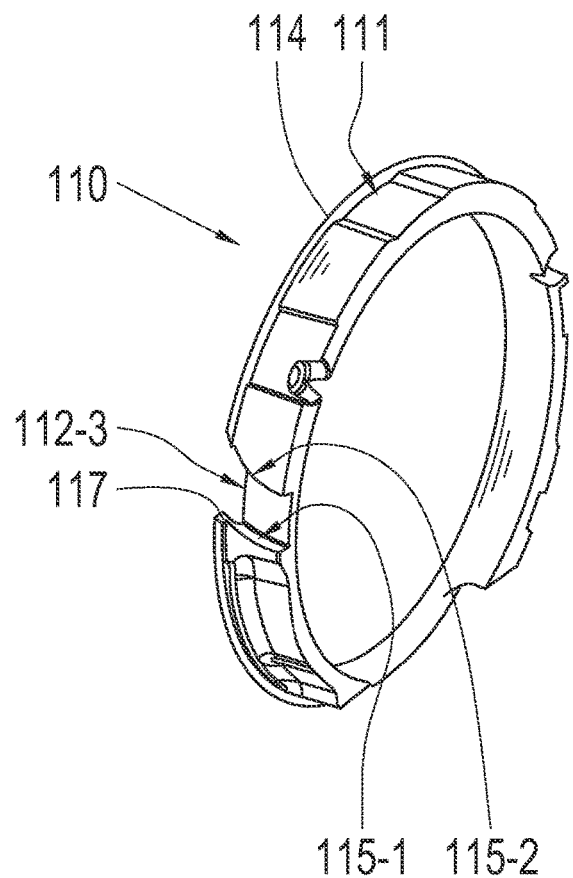
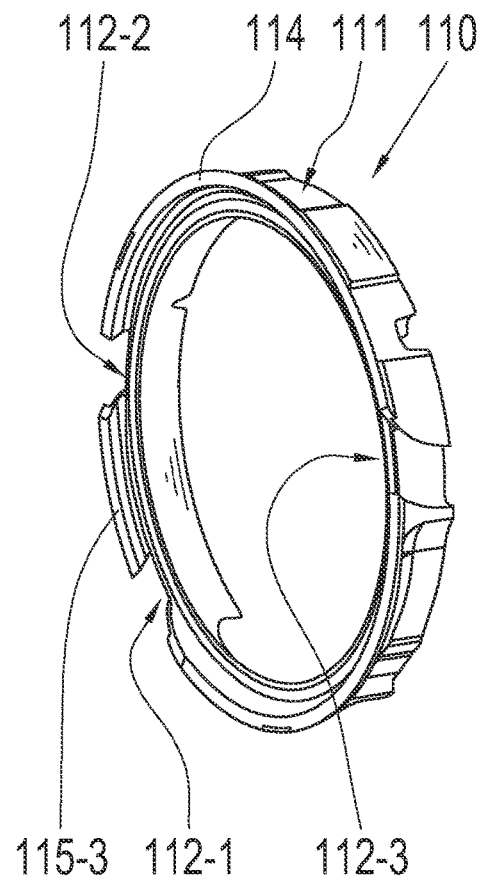
Fig. 2a    Fig. 2b
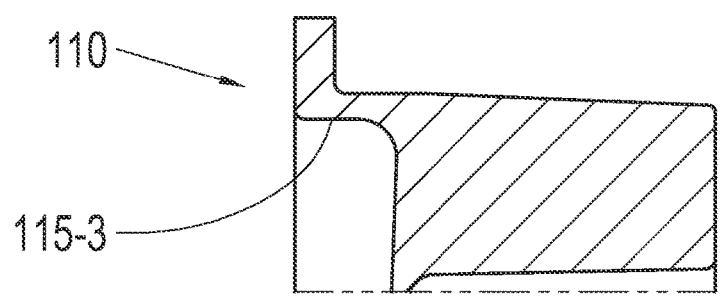
Fig. 2c

DAMPER ARRANGEMENT AND TRANSMISSION FOR A MOTOR VEHICLE DRIVE TRAIN

CROSS-REFERENCE TO RELATED APPLICATION

The present application is related and has right of priority to German Patent Application No. 10 2020 205 466.5 filed on Apr. 30, 2020, the entirety of which is incorporated by reference for all purposes.

FIELD OF THE INVENTION

The present invention relates to the arrangement of a damper and of a fluid guide element in a motor vehicle drive train. The invention further relates to a transmission with such an arrangement.

BACKGROUND

A damper is implemented in the motor vehicle drive train for damping torsional vibrations generated by the internal combustion engine of the drive train. For example, rotational speed-adaptive dampers are implemented for this purpose. The damper is an integral part of a transmission, which is arranged in the motor vehicle drive train between the internal combustion engine and the driving wheels. Such transmissions are usually partially filled with transmission oil for lubrication and cooling. During a brake application and during downhill travel, the transmission oil can advance out of an oil sump to the rotating damper. The transmission oil is churned and/or turbulently swirled up by the damper. As a result, oil foam forms and increased hydraulic drag occurs. Particularly, during the formation of oil foam, the oil level in the transmission continues to rise, as the result of which an increase in drag torque of the damper occurs. In addition, there is a risk that transmission oil swirled around by the damper will leak out of a transmission breather.

SUMMARY OF THE INVENTION

Thus, an arrangement is provided by which a foaming and/or a swirling of a fluid surrounding a damper is at least reduced.

The disclosed arrangement is made up of a damper and a fluid guide element. The damper is utilized for damping torsional vibrations and is, for example, a rotational speed-adaptive damper. Such a damper is also referred to as a centrifugal force pendulum. The damper can include a single or multiple absorption or damper mass(es), which is/are movably arranged at a damper mass carrier. The damper masses become displaced, due to centrifugal force, in a radial direction and in the circumferential direction and, as a result, dampen torsional vibrations of the drive train.

The fluid guide element is attached in a rotatably fixed manner and arranged axially adjacent to the damper. The fluid guide element has at least one duct. The duct is arranged and designed such that, due to the rotation of the damper, a fluid surrounding the damper, in sections, is conveyed into the duct.

The rotation of the damper is used to convey fluid away from the damper through the at least one duct of the fluid guide element. The efficiency of the conveying action results from the arrangement and the shape of the fluid guide element with the at least one duct in relation to the damper.

The fluid guide element is an annular structure. The annular structure of the fluid guide element follows the essentially annular structure of the damper.

Preferably, the fluid guide element includes an extension, which at least partially projects over a circumference of the damper in the axial direction. The extension is beveled and concavely curved with respect to the circumferential direction and the axial direction. Due to the extension, fluid swirled up by the rotating damper is obstructed from being radially slung off. Due to the damming effect at the extension, the fluid is guided, instead, into the at least one duct of the fluid guide element and, in this way, conveyed away from the damper. As a result, the efficiency of the conveying action of the fluid guide element is improved.

The at least one duct is, for example, a groove, which is introduced into the fluid guide element at a circumference. In other words, the duct in such an embodiment has an open cross-section. Such an embodiment is particularly easy to manufacture.

Preferably, a circumferential wall of the duct is at least partially beveled with respect to the axial direction and the circumferential direction. Due to the rotation of the damper, the fluid is accelerated in the circumferential direction. Particularly, due to the fact that the circumferential wall of the duct is at least partially beveled with respect to the axial direction and the circumferential direction, the fluid accelerated in the circumferential direction is deflectable in the axial direction by the circumferential wall of the duct and, thereby, conveyed away from the damper mass carrier. Such an embodiment of the circumferential wall can therefore bring about an increase of the fluid conveyed away from the carrier in the axial direction.

Preferably, the circumferential wall extends at least partially in a concave manner. The circumferential wall is beveled, for example, such that it has an at least partially concave curvature. Fluid accelerated in the circumferential direction, which flows into the duct, is therefore deflectable in the axial direction by the concavely curved, circumferential wall and, as a result, conveyed away. Due to the concave curvature, an inflow angle of the fluid upon impact on the circumferential wall is reduced. According to principles of fluid dynamics, a flow rate of the fluid through the duct is thereby increased.

Preferably, a first circumferential wall and a second circumferential wall, opposite the first circumferential wall, of the duct extend at least partially obliquely with respect to the circumferential direction and the axial direction. The first circumferential wall is designed, for example, according to the circumferential wall described in preceding exemplary embodiments, in order to deflect the fluid accelerated in the circumferential direction into the axial direction. The second circumferential wall is beveled, for example, such that a suction arises at the second circumferential wall, which additionally accelerates the fluid in the axial direction and, thereby, increases the quantity of fluid that is conveyed away.

Preferably, the first circumferential wall extends concavely and the second circumferential wall extends convexly. Due to a convex curvature of the second circumferential wall, an entrance angle of the fluid into the duct is reduced. As explained more precisely further below, a quantity of the conveyed-away fluid is increased as a result.

Preferably, the fluid guide element includes at least one second duct. The second duct is also arranged and designed such that fluid is conveyed into the second duct due to the rotation of the damper. Due to the second duct, the total quantity of conveyed-away fluid is increased. The first duct and the second duct are preferably introduced into the circumference of the fluid guide element at different positions.

Preferably, the fluid guide element is aligned such that the first duct and the second duct are arranged at different heights relative to each other. "Height" is understood as the vertical distance between a central axis of the fluid guide element and the particular duct in the installation position of the fluid guide element. Given this type of arrangement of the first duct and the second duct, the first duct is utilized for conveying the fluid away from the damper on the shortest path. The second duct is utilized for carrying away fluid that is transported, during the rotation of the damper, by the damper in the circumferential direction above a level of the fluid. As a result, in particular, the fluid that is transported along the circumference of the damper is conveyed away. As a result, the quantity of the conveyed-away fluid is increased and, thereby, the foaming of the fluid is reduced.

The level of the fluid is understood as a fill level of the fluid in a normal position of the damper arrangement without inclination at a usual operating temperature of the fluid. The first duct is preferably arranged slightly above the level and the second duct well above the level.

Preferably, the second duct is arranged, in the circumferential direction, at an angular distance with respect to the first duct of more than 45° and less than 100°. The second duct is arranged, for example, in a lateral circumferential area. As a result, fluid that is transported, during the rotation of the damper, by the damper in the circumferential direction above the level is conveyed away by the second duct. In addition, as a result, fluid conveyed away through the second duct is at least partially prevented from escaping through a bleed valve, which is arranged, on the output side of the fluid guide element, in an upper circumferential area, i.e., for example, at an angular distance of more than 100° in the circumferential direction with respect to the first duct.

The breather valve in the case of vehicle transmissions is arranged, for example, in the axial direction adjacent to an upper vertex of the damper circumference.

Preferably, the fluid guide element includes at least one third duct. The third duct is also arranged and designed such that fluid is conveyed into the third duct due to the rotation of the damper. Due to the third duct, the total quantity of conveyed-away fluid is increased. The third duct is arranged, in the circumferential direction, at an angular distance with respect to the second duct of more than 140° and less than 200°. Due to such an arrangement of the second duct and the third duct, the second duct is arranged, for example, on a first side and the third duct is arranged on a second side of the fluid guide element.

Due to the arrangement of the second duct and the third duct on the first side and the second side, respectively, of the fluid guide element, it is achieved that at least one of the second duct and the third duct is situated above a dynamic level. Therefore, fluid transported in the circumferential direction by the damper is conveyed away in the axial direction also during cornering. Therefore, a foaming of the fluid by the damper is also reduced during cornering.

Preferably, the fluid guide element includes a radially inward directed wall, which at least partially overlaps the damper in the axial direction. The inwardly directed wall extends, for example, in the radial direction inward from the circumference of the fluid guide element. As a result, in particular, a return flow of the conveyed-away fluid and, thereby, the foaming of the fluid is reduced. In addition, an inflow of fluid to the damper is inhibited by the wall, in particular during braking operations of the motor vehicle.

The damper arrangement is an integral part of a motor vehicle transmission, for example, an automatic transmission, a dual clutch transmission, an automated manual transmission, or a CVT transmission. The fluid surrounding the damper in sections is, for example, a transmission oil for cooling and lubricating elements of the transmission.

For an application of the damper arrangement in a motor vehicle transmission, the fluid guide element includes a flange arranged at a circumference of the fluid guide element, which is utilized for securing the fluid guide element between two elements of the transmission. For example, the flange is clampable between a housing and a bearing shield of the transmission. A design of this type allows for a simple installation of the fluid guide element.

The bearing shield is fixedly connected to the housing in the axial direction, for example, by a bolted connection. The bolted connection is designed such that the flange is arranged without play or movement between the bearing shield and the housing. As a result, an attachment of the bearing shield onto the housing advantageously acts to fasten the bearing shield and to secure the fluid guide element in the axial direction.

Preferably, the flange has at least one elastically deformable section. The elastic section is supported in the axial direction between the housing and the bearing shield when the fluid guide element is installed in the transmission with preload. As a result, the fluid guide element is arranged in the axial direction without play or movement. As a result, for example, wear effects, which can occur due to dynamic loading of the fluid guide element, are avoided. In addition, a reliable and exact positioning of the fluid guide element is achieved such that a spatial distance of the fluid guide element to adjacent components is kept low.

In many exemplary embodiments, the elastic section is designed such that the preload diminishes over time and operating temperature after the installation of the fluid guide element. The fluid guide element is made, for example, of so-called "relaxing" plastic. Such plastics have load-dependent and temperature-dependent creep properties, which cause the preload to decrease due to deformation. As a result, a permanent mechanical loading of the elastic section is reduced.

BRIEF DESCRIPTION OF THE DRAWINGS

Exemplary embodiments of the invention are explained in greater detail in the following with reference to the attached figures, in which:

FIG. 2a shows a perspective view of a fluid guide element of a damper arrangement in accordance with aspects of the present subject matter;

FIG. 2b shows another perspective view of the fluid guide element of the damper arrangement of FIG. 2a in accordance with aspects of the present subject matter;

FIG. 2c shows a detailed section view of the fluid guide element of FIGS. 2a and 2b in accordance with aspects of the present subject matter;

DETAILED DESCRIPTION

Figure 1A:
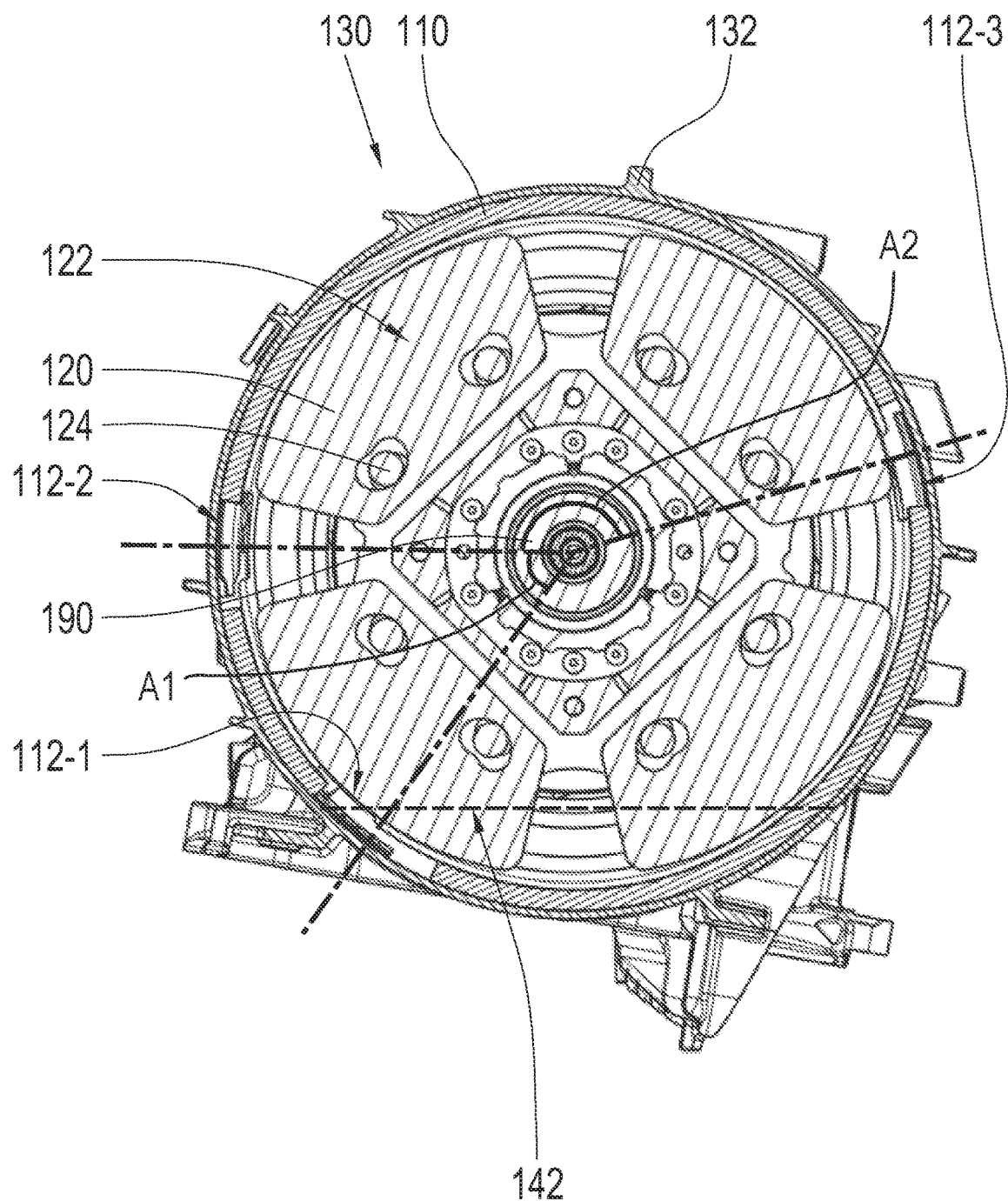
FIG. 1a shows a section view of a transmission with a damper arrangement as viewed along an axial direction in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Although exemplary embodiments can be modified and changed in various ways, exemplary embodiments are represented in the figures as examples and are described in detail herein. It is to be made clear, however, that it is not intended to limit exemplary embodiments to the particular disclosed forms, but rather that exemplary embodiments are to cover all functional and/or structural modifications, equivalents, and alternatives that fall within the scope of the invention.

Transmissions, which are utilized, for example, in vehicles for power transmission, are partially filled with transmission oil for lubrication and for cooling.

Particularly, in the case of vehicle transmissions, longitudinal accelerations, which occur, for example, during deceleration and acceleration of the vehicle, cause the transmission oil to become displaced toward a damper, which is arranged within the transmission. Alternatively, such displacements of the transmission oil occur during position changes of the transmission, i.e., for example, during downhill travel or uphill travel of a vehicle equipped with the transmission.

Such displacements of the transmission oil result, for example, in the damper being at least partially surrounded by the transmission oil. During operation, the damper can rotate and, as a result, swirl up the transmission oil. The result is the foaming, the so-called "foaming up" or "churning", of the transmission oil. As a result, drag torques arise between the damper and the transmission oil, which negatively affect an efficiency of the transmission.

Due to the foaming, the transmission oil flows back into an oil sump, which is provided for storing the transmission oil, more slowly than in an "unfoamed" condition. As a result, the transmission oil is not available, for example, in a sufficient quantity for cooling and/or for lubrication.

Figure 1B:
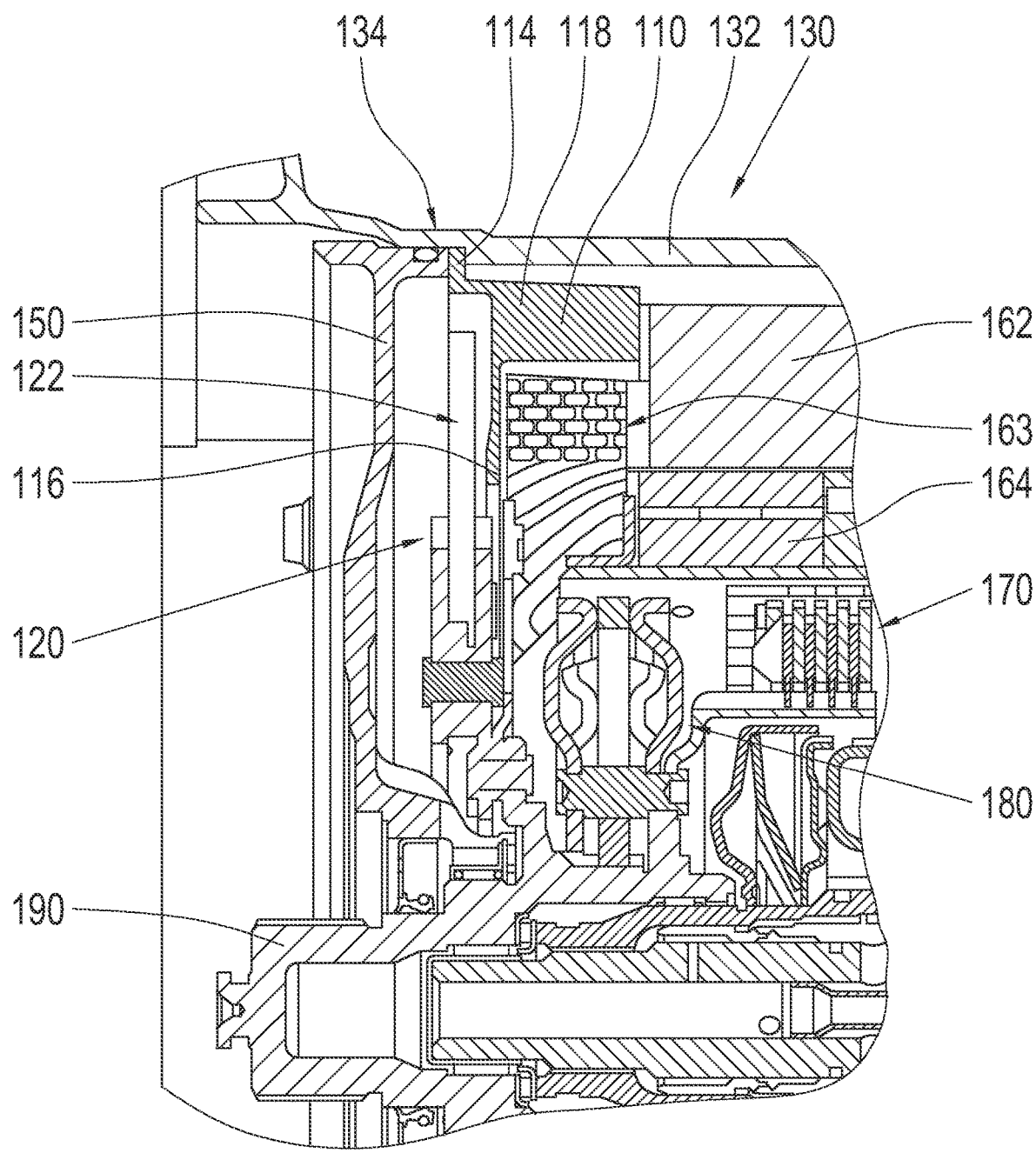
FIG. 1b shows a section view of the transmission of FIG. 1a as viewed along a lateral direction in accordance with aspects of the present subject matter.

Referring now to FIGS. 1a and 1b, FIG. 1a shows a section view of a transmission 130 with a damper arrangement viewed along an axial direction and FIG. 1b shows a section view of the transmission 130 viewed along a lateral direction.

The damper arrangement includes a damper 120 and a fluid guide element 110. The damper 120 and the fluid guide element 110 are arranged within a housing 132 of the transmission 130.

As is apparent in FIG. 1b, the transmission 130 also includes a stator 162 with a coil winding 163 and a rotor 164 of an electric prime mover or motor. Moreover, the transmission 130 includes a separating clutch 170 for decoupling an internal combustion engine from the electric prime mover and a torsional vibration damper 180 for damping torsional vibrations.

The fluid guide element 110 is made of electrically non-conductive plastic, in particular for applications of the damper arrangement in transmissions of hybrid vehicles, as shown, for example, in FIG. 1a, in order to avoid an electrically conductive contact from the electric prime mover, via the fluid guide element 110, onto the housing 132.

The damper 120 is coupled, for example, to an input shaft 190, which is connected to a crankshaft (not represented in the figures) of an internal combustion engine. The damper 120 includes multiple damper masses 122, which are movably arranged on a damper mass carrier of the damper 120. In order to movably accommodate the damper masses 122, the damper 120 includes multiple bolts 124, which extend through the damper masses 122 in the axial direction. The damper masses 122 have movement or play with respect to the bolts 124, and so, in particular, displacements of the damper masses 122 in a radial direction within the allowed movement or play are possible. As a result, the damper 120 is capable of damping torsional vibrations of the drive train via displacements of the damper masses 122.

The damper 120 is at least partially surrounded by a transmission oil. The damper is immersed in transmission oil, for example, up to a level 142 (shown in dashed lines in FIG. 1a). In addition, the transmission oil is swirled up by the rotating damper 120 such that the damper 120 is surrounded by the transmission oil above the level 142. The level 142 is understood as a fill level of the transmission oil, which sets in or occurs, for example, at a constant longitudinal acceleration or at rest. The level 142 shown is therefore also understood as a "static level".

The fluid guide element 110 includes a first duct 112-1, which is arranged, at least partially, slightly above the level 142. In addition, the fluid guide element 110 includes a second duct 112-2 and a third duct 112-3, which are arranged well above the level 142.

The dimensions/extents of the ducts 112-1, 112-2, 112-3 are configured such that the transmission oil is conveyed away from the damper mass carrier in the axial direction through the ducts 112-1, 112-2, 112-3.

The first duct 112-1 is utilized, in particular, for conveying the transmission oil, which is displaced when the damper masses 122 plunge into the transmission oil 140 below the level 142, away on a short path in the axial direction.

The ducts 112-2 and 112-3 are utilized, in particular, for conveying the transmission oil, which is transported upward by the damper masses 122 along the circumference of the rotating damper 120, away in the axial direction.

Preferably, the fluid guide element 110 is aligned such that the first duct 112-1 and the second duct are arranged at different heights or vertical distances from a central axis of the fluid guide element. For instance, the second duct 112-2 is arranged, in the circumferential direction, at a first angular distance A1 (FIG. 1a) of more than 45° and less than 100° from the first duct 112-1. As a result, fluid that is transported, during the rotation of the damper 120, by the damper 120 in the circumferential direction above the level 142 (FIG. 1a) is conveyed away by the second duct 112-2.

For instance, during lateral accelerations, the transmission oil 140 and its level moves to the side such that the first duct 112-1 and either the second duct 112-2 or the third duct 112-3 are located below this dynamic level (not represented). During such lateral accelerations, the second duct 112-2 and the third duct 112-3 are therefore utilized, similarly to the first duct 112-1, for conveying transmission oil, which has been displaced by the damper 120, away in the axial direction. At least one of the three ducts 112-1, 112-2, 112-3, therefore, is above the dynamic level.

Due to a second angular distance A2 (FIG. 1a) between the second duct 112-2 and of the third duct 112-3 of more than 140° and less than 200° in the circumferential direction, it is ensured that at least one of the ducts 112-2 and 112-3 is situated above the level 142 (FIG. 1a) also in the case of such lateral accelerations. As a result, a continuous conveying-away of swirled-up transmission oil is made possible.

In the damper arrangement shown here, the first duct 112-1 is, for all intents and purposes, at "7 o'clock", the second duct 112-2 is at "9 o'clock", and the third duct 112-3 is at "3 o'clock".

Such an arrangement of the ducts 112-1, 112-2, 112-3 makes it possible, for example, to convey the transmission oil away from the damper 120, in a targeted manner, into lateral areas of the transmission 130. From the lateral areas of the transmission 130, transmission oil flows back into the oil sump of the transmission 130 faster than, for example, from areas of the transmission 130 above the second duct 112-2 and the third duct 112-3.

Alternatively, the ducts 112-1, 112-2, 112-3 are arranged in a mirror image in a horizontal direction, for example, such that the ducts 112-1, 112-2, 112-3 are mirrored about a vertical axis.

In addition, the fluid guide element 110 includes a radially inward directed wall 116 shown in FIG. 1b, which extends from the annular body 118 inward in the radial direction. The wall 116, for example, at least partially seals off an advance of the transmission oil to the damper 120 in the axial direction. In particular, the wall 116 directs transmission oil, which leaks out of the area of the rotor 164 in the axial direction towards the damper 120, outward in the radial direction and then the annular body 118 directs the leaked transmission oil in the axial direction toward the output side of the fluid guide element 110.

In some embodiments, wall 116 is made of an electrically non-conductive material, such as, for example, an appropriate plastic. As a result, an electrically conductive contact from the coil winding 163 to the housing 132 is avoided. In embodiments where the wall 116 is made of electrically non-conductive material, the wall 116 is therefore arranged closer to the coil winding 163 than in embodiments where the wall 116 is made of conductive material.

The fluid guide element 110 has a flange 114, which is arranged at a radially outer circumference of the fluid guide element 110. In order to position the fluid guide element 110, the flange 114 is clamped between a bearing shield 150 and the housing 132 of the transmission 130.

In addition, the flange 114 is fitted into a centering seat 134 of the housing 132 in order to center the fluid guide element 110 with respect to the damper 120. The centering seat 134 is a shoulder on the inner circumference of the housing 132.

FIG. 2a through FIG. 2g show an exemplary embodiment of the fluid guide element 110.

Figure 2D:
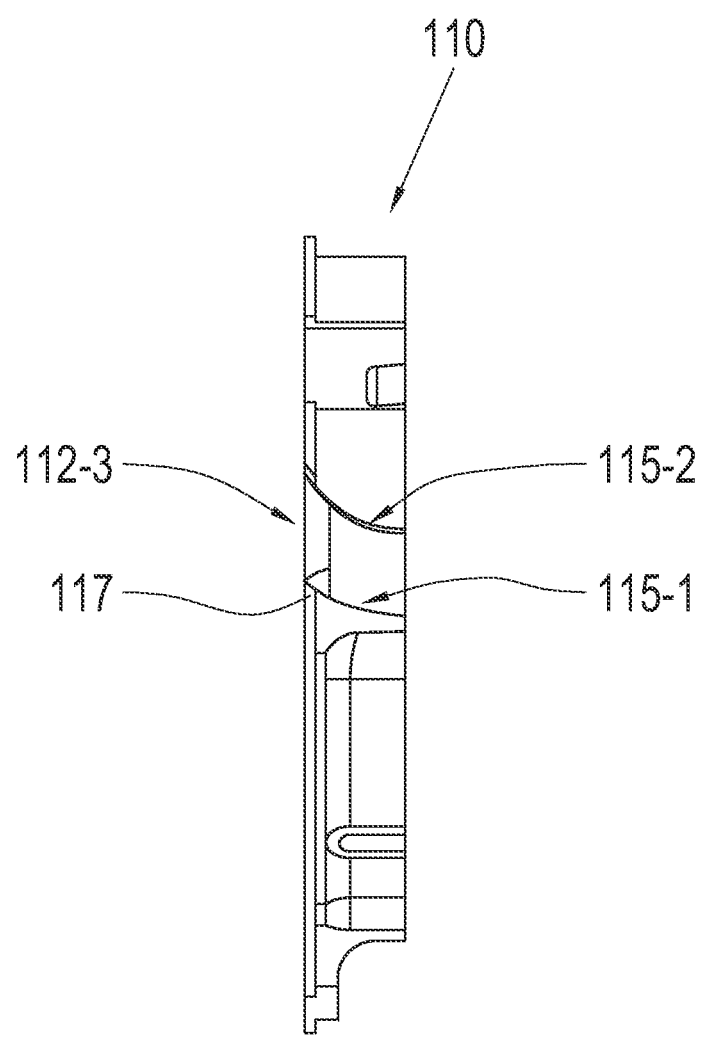
FIG. 2d shows a side view of the fluid guide element of FIGS. 2a-2c in accordance with aspects of the present subject matter.
Figure 2E:
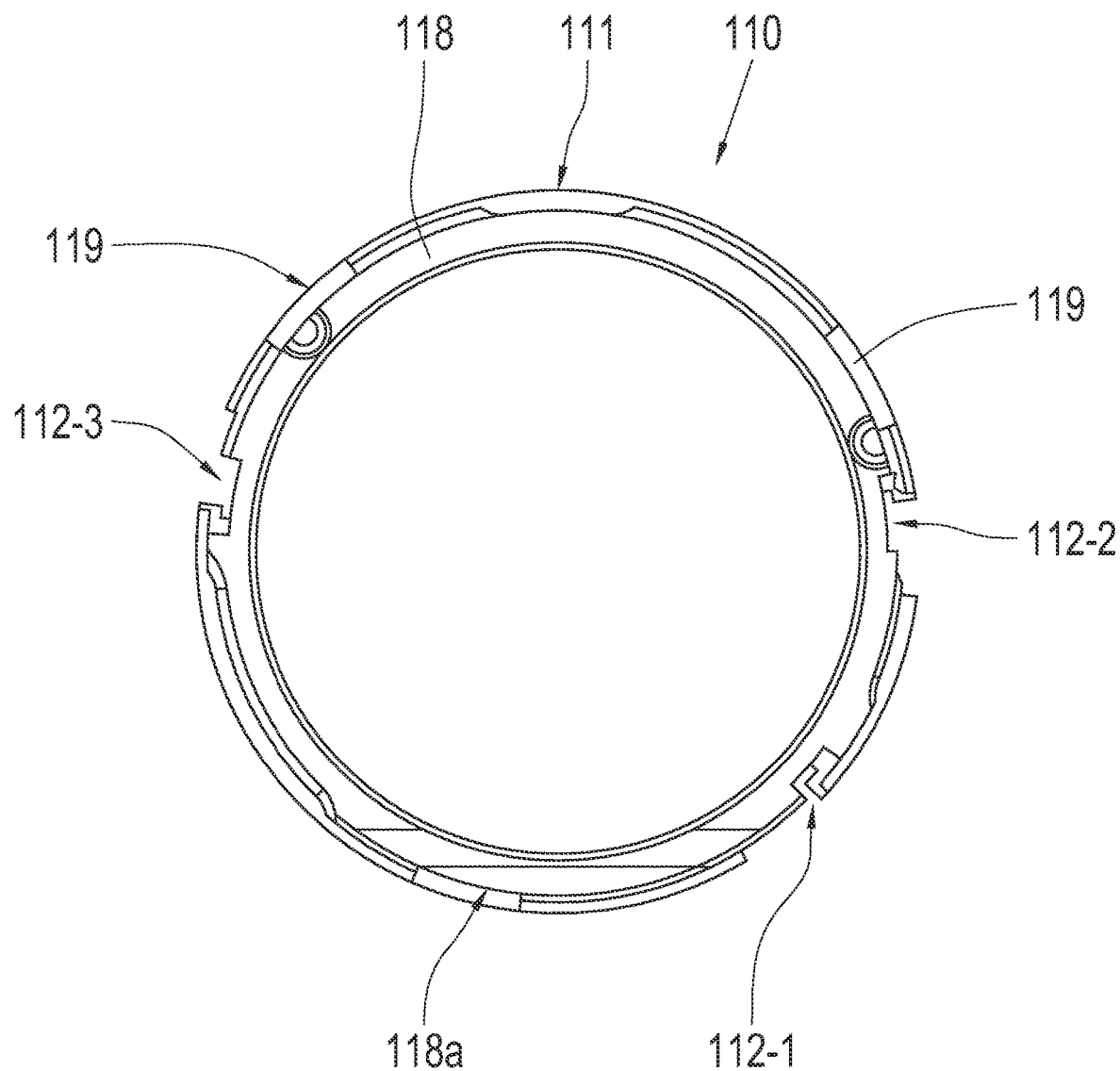
FIG. 2e shows a plan view from the output side of the fluid guide element of FIGS. 2a-2d in accordance with aspects of the present subject matter.
Figure 2F:
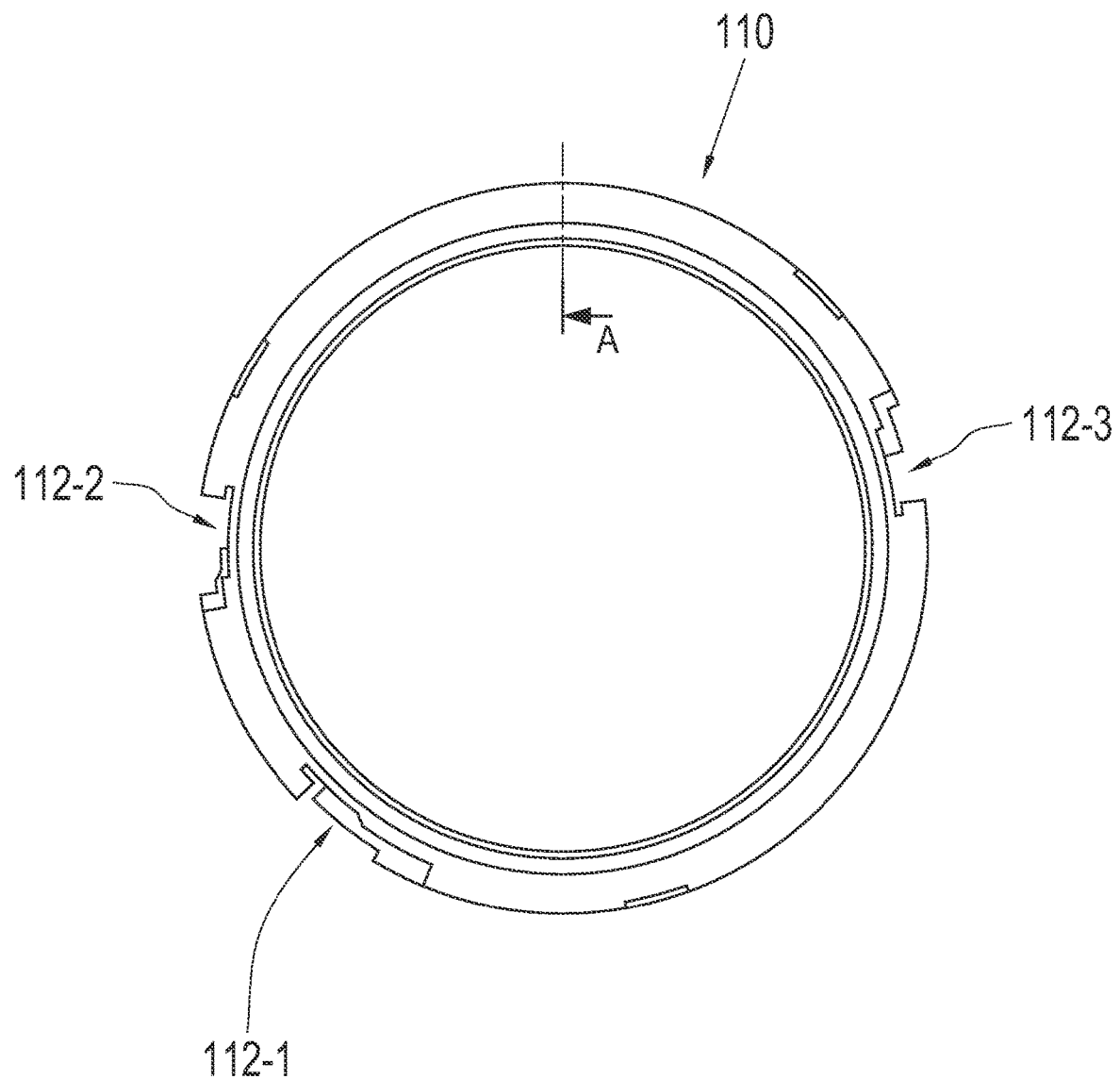
FIG. 2f shows a plan view from the input side of the fluid guide element of FIGS. 2a-2e in accordance with aspects of the present subject matter.
Figure 2G:
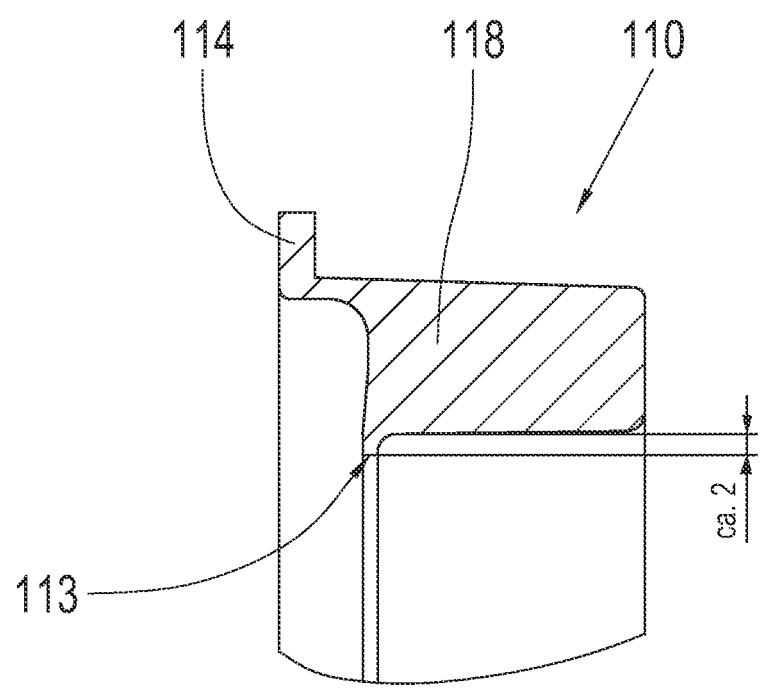
FIG. 2g shows a partial, section view of a circumferential area of the fluid guide element of FIGS. 2a-2f in accordance with aspects of the present subject matter.

FIG. 2a shows a perspective view of the fluid guide element 110 from the output side of the damper 120, and FIG. 2b shows a perspective view of the fluid guide element 110 from the input side of the damper 120. FIG. 2c shows a sectional view of a detail of the fluid guide element 110. FIG. 2d shows a side view of the fluid guide element 110. FIG. 2e shows a plan view of the fluid guide element 110 from the output side, and FIG. 2f shows a plan view of the fluid guide element 110 from the input side. FIG. 2g shows a further sectional, detail view of the fluid guide element 110.

As represented in FIG. 2a on the basis of the duct 112-3, the ducts 112-1, 112-2, 112-3 each have a first circumferential wall 115-1 and a second circumferential wall 115-2. The first circumferential wall 115-1 is concave. The second circumferential wall 115-2 is convex. In this way, the ducts 112-1, 112-2, 112-3 enclose an acute angle (<90°). In this type of embodiment of the first circumferential wall 115-1 and the second circumferential wall 115-2, the ducts 112-1, 112-2, 112-3 each form an acute-angled junction for transmission oil that is moved in the circumferential direction when the damper 120 rotates.

In other words: during the rotation of the damper masses 122, the transmission oil 140 surrounding the damper 120 is displaced by the damper masses 122 in the circumferential direction along the damper-side inner diameter 115-3 of the fluid guide element 110 shown in FIG. 2c and, due to the rotation of the damper 120, is conveyed into the ducts 112-1, 112-2, 112-3 and, from these, is conveyed away in the axial direction toward the output side of the damper 120 via the above-described curved path over the circumferential walls 115-1. As a result, at least a portion of the transmission oil surrounding the damper 120 is reduced and, thereby, the foaming of the transmission oil is reduced.

Alternatively, the first circumferential wall 115-1 and the second circumferential wall 115-2 are beveled in another way with respect to the axial direction and the circumferential direction. Due to the concave and convex embodiments of the first circumferential wall 115-1 and the second circumferential wall 115-2, respectively, an entrance angle of the ducts 112-1, 112-2, 112-3 is smaller as compared to alternative embodiments of the ducts 112-1, 112-2, 112-3. According to principles of fluid dynamics, a flow rate of the transmission oil that is conveyed away through the ducts 112-1, 112-2, 112-3 is therefore greater than in the case of alternative embodiments of the ducts 112-1, 112-2, and 112-3.

As shown with the example of the third duct 112-3, the ducts 112-1, 112-2, 112-3 each include an extension 117 at the first circumferential wall 115-1, which extends flush with the first circumferential wall 115-1, is concavely curved, and, in the installed condition of the fluid guide element 110, at least partially projects over a circumference of the damper in the axial direction and radially outside of the damper masses 122. As a result, transmission oil, which flows radially outside the damper masses 122 and along the damper-side inner diameter 115-3, is conveyed away in the axial direction.

As is apparent in FIG. 2e, the annular body 118 has, at the radially outer circumference, a contour offset 111 in the radial direction, into which the housing 132 engages in the radial direction in order to prevent rotation of the fluid guide element 110.

Optionally, the fluid guide element 110 includes multiple contour offsets with respect to the housing 132, which are not introduced into the circumference of the fluid guide element 110 in a rotationally symmetrical manner. As a result, an incorrect alignment of the fluid guide element 110 during the assembly of the transmission 130 is avoidable.

The annular body 118 has a recess 118a in the lower circumferential area on the output side, which is utilized as an oil drainage opening and as a reservoir for transmission oil that collects on the output side in the lower circumferential area of the fluid guide element 110.

In addition, the fluid guide element 110 includes multiple elastic sections 119, which will be subsequently dealt with in greater detail in the present disclosure.

In contrast to the exemplary embodiment shown in FIG. 1b having the inwardly directed wall 116, the exemplary embodiment of the fluid guide element 110 shown in FIG. 2g has a step 113 at the inner circumference of the annular body 118, which extends inwardly from the inner circumference of the annular body 118 along the radial direction to a lesser extent than the wall 116. As a result, material is saved during production of the fluid guide element 110. In addition, this type of fluid guide element 110 is particularly compact, in particular between the damper 120 and the coil winding 163.

Figure 3:
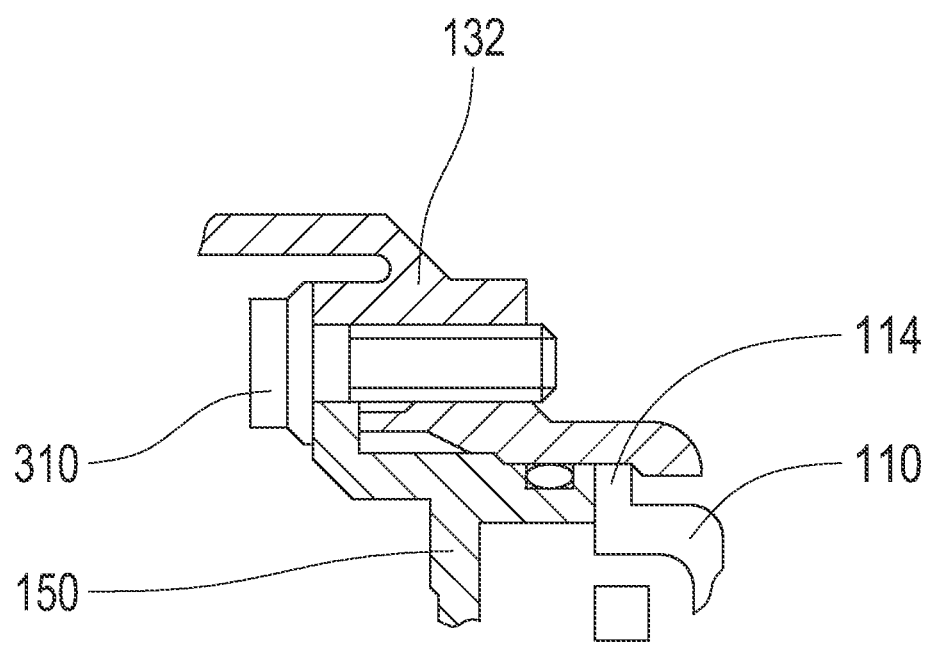
FIG. 3 shows a partial, section view of a fluid guide element and of a bearing shield attached to a transmission housing in accordance with aspects of the present subject matter.

FIG. 3 shows the bearing shield 150 attached to the housing 132 to secure the fluid guide element 110 in the axial direction. As shown, the bearing shield 150 is connected to the housing 132 via a bolted connection 310. By adjusting a torque of the bolted connection 310, a tension is set that clamps fluid guide element 110 in the axial direction between the bearing shield 150 and the housing 132.

Figure 4A:
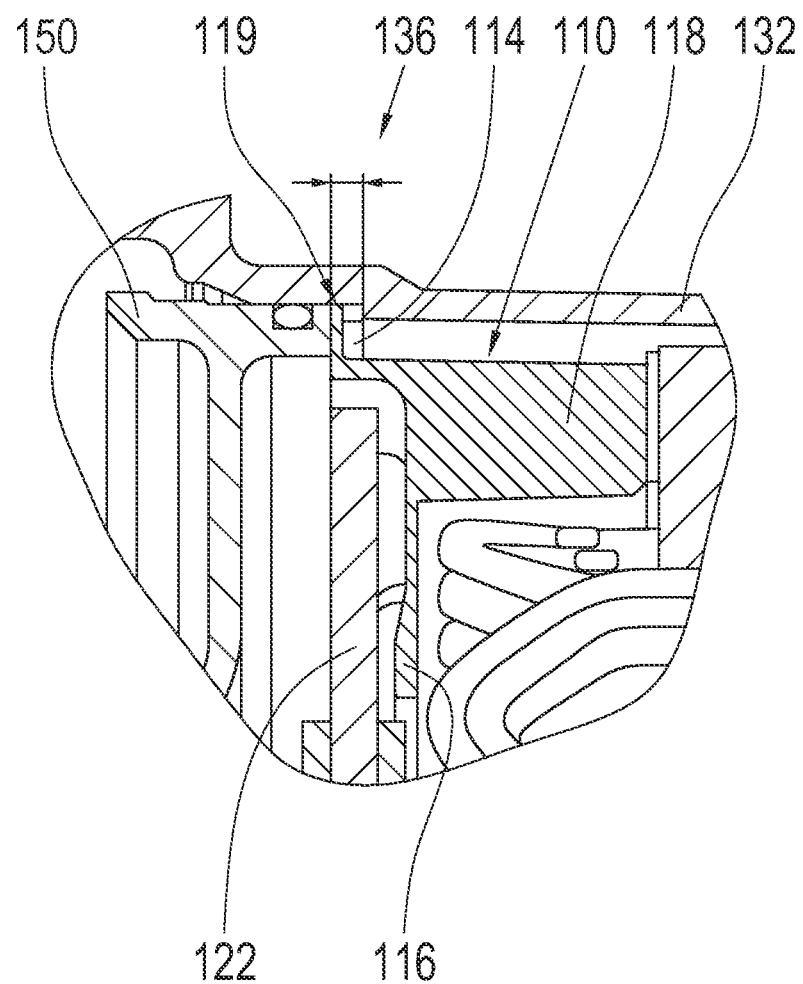
FIG. 4a shows a detailed section view of a transmission having a fluid guide element in accordance with aspects of the present subject matter.

In FIG. 4a, an arrangement of the flange 114 between the bearing shield 150 and the housing 132 is represented. In order to achieve a playfree retention of the fluid guide element 110 in the axial direction between the bearing shield 150 and the housing 132, the axial gap 136 is sized such that the flange 114 is supported, under a preload, with the elastic sections 119 against the bearing shield 150 toward the input side and with locating faces of the flange 114 against the housing 132 toward the output side.

The preload is determined in the axial direction, in particular, via a thickness and via a material of the elastic sections 119. As is apparent, a thickness of the elastic sections 119 in the axial direction is, therefore, for example, less than a maximum thickness of the flange 114.

Figure 4B:
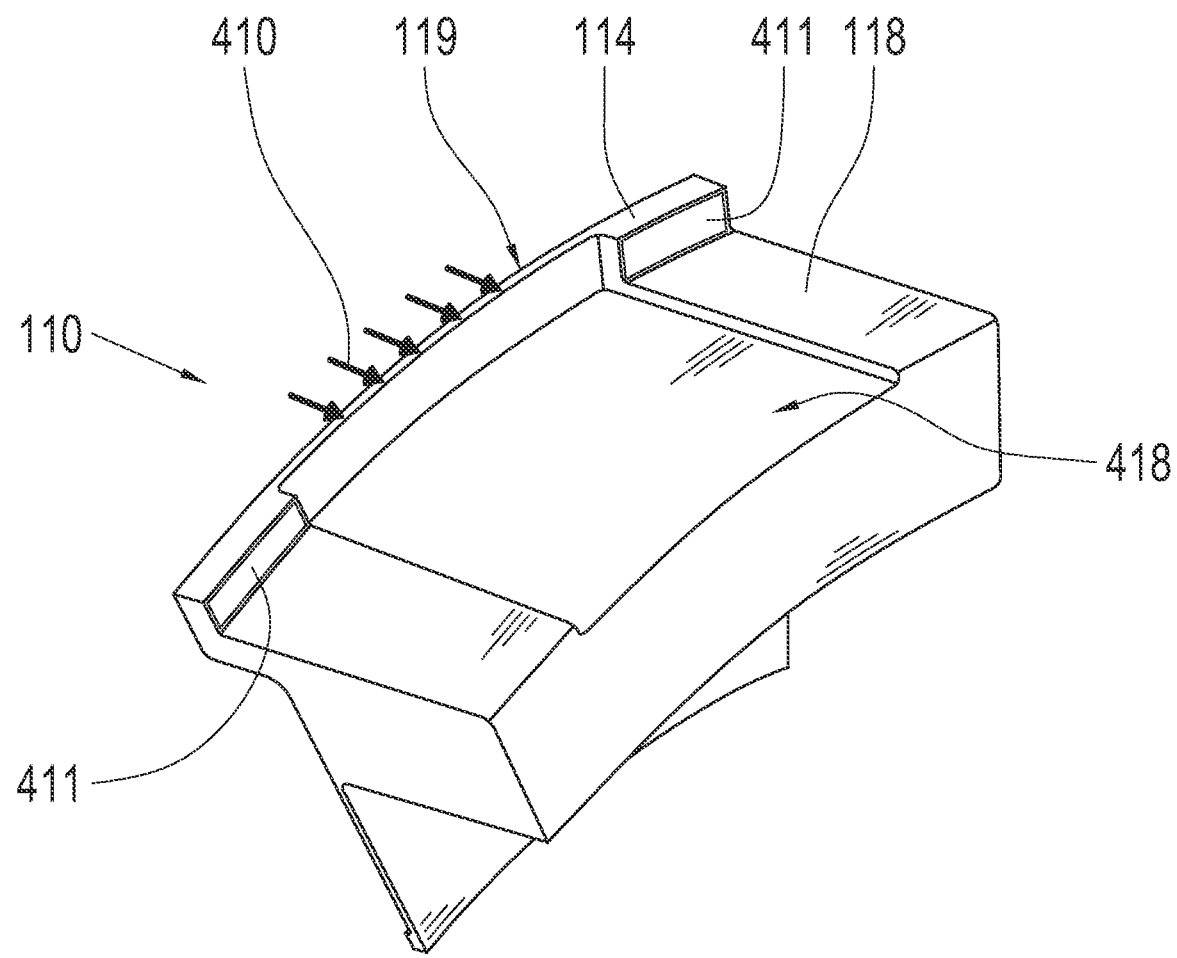
FIG. 4b shows a view of an elastic section of a flange of the fluid guide element of FIG. 4a in accordance with aspects of the present subject matter.
Figure 4C:
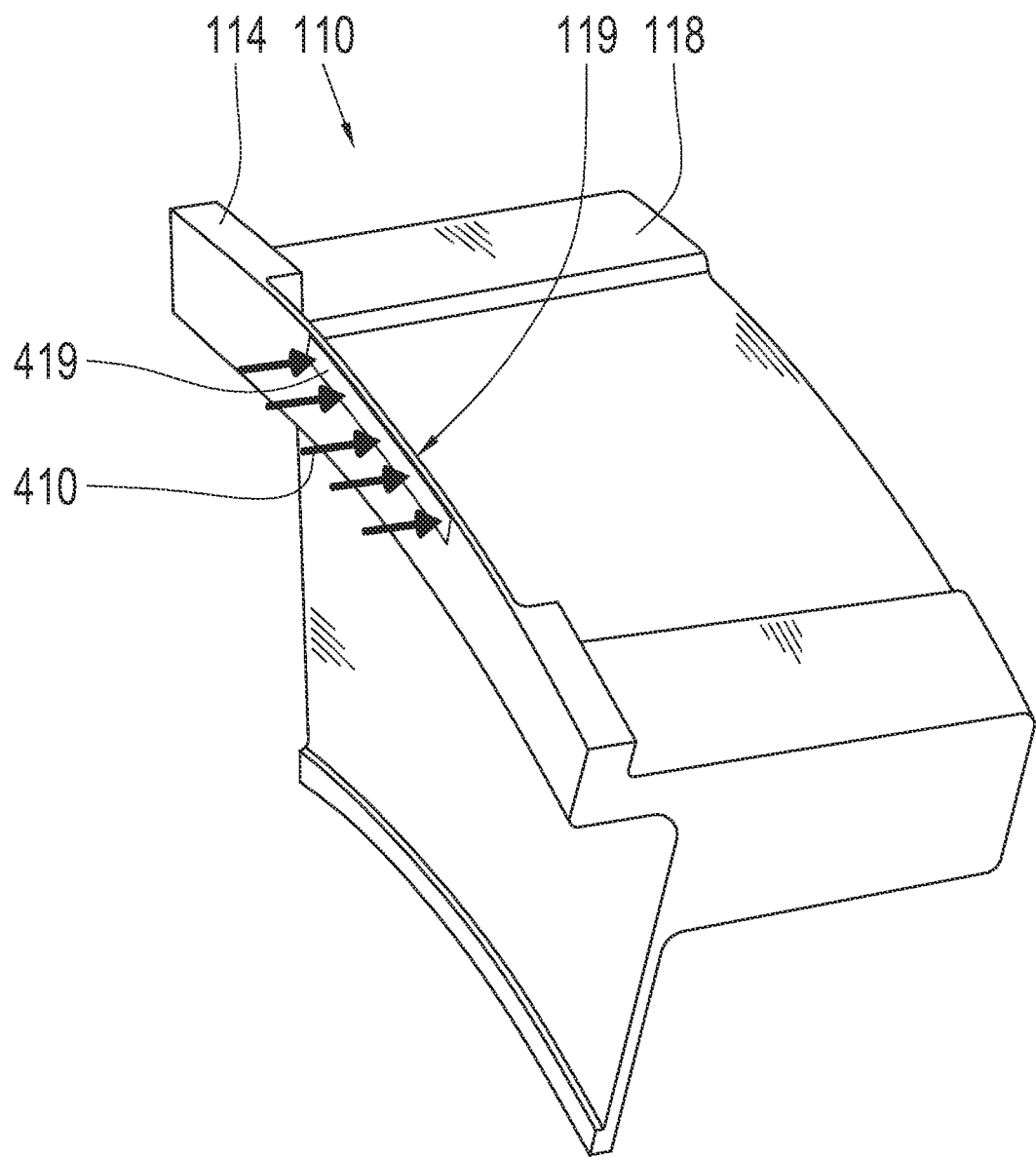
FIG. 4c shows a further view of the elastic section of the fluid guide of FIGS. 4a and 4b in accordance with aspects of the present subject matter.

As represented by FIG. 4b and FIG. 4c, the elastic sections 119 are acted upon in the axial direction by a preload 410 upon installation of the fluid guide element 110, and so the elastic sections 119 rest against the bearing shield 150 and the locating faces 411 against the housing 132 under the preload 410 (as shown in FIG. 4a). The elastic sections 119 extend further in the circumferential direction than the contact surfaces 419, which are provided for the contact of the elastic sections 119 with the bearing shield 150, in order to allow for a deformation of the elastic sections 119 under the preload 410.

In addition, annular body sections 418, which are axially aligned with respect to the elastic sections 119, are thinner in the radial direction than a radial thickness of the remaining annular body 118 to reduce a rigidity of the elastic sections 119.

Figure 4D:
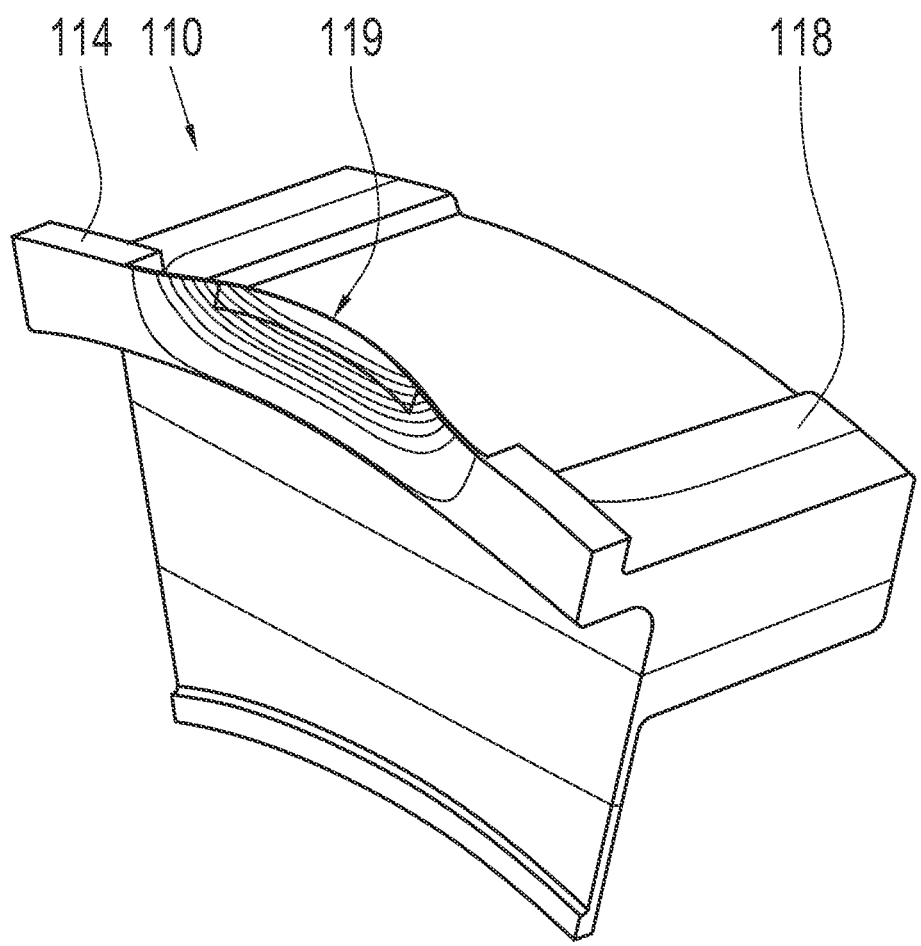
FIG. 4d shows the elastic section of the fluid guide of FIGS. 4a-4c under preload in accordance with aspects of the present subject matter.

Upon an installation of the fluid guide element 110 under the preload 410, the targeted deformation of the elastic sections 119 occurs as shown in FIG. 4d, in order to achieve an axial absence of play of the fluid guide element 110 within the axial gap 136.

The elastic sections 119 are made of a so-called "relaxing material", such as, for example, an appropriate plastic, which has load-dependent and temperature-dependent creep properties, due to which the preload applied during installation decreases over time. In this way, preloads within the housing 132, the bearing shield 150, and the fluid guide element 110 at least partially diminish over time.

The aspects and features described together with one or several of the previously detailed examples and figures can also be combined with one or several of the other examples, in order to replace an identical feature of the other example or in order to additionally incorporate the feature into the other example.

In addition, the following claims are hereby incorporated into the detailed description, where each claim can exist on its own as a separate example. While each claim can exist on its own as a separate example, it is to be noted that—although a dependent claim, in the claims, can relate to a certain combination with one or several other claim(s)—other examples can also include a combination of the dependent claim with the subject matter of every other dependent or independent claim. Such combinations are explicitly proposed here, provided it is not indicated that a certain combination is not intended. Moreover, features of a claim are also to be included for every other independent claim, even if this claim is not made directly dependent on the independent claim.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims.

REFERENCE CHARACTERS 110 fluid guide element
111 contour offset
112-1 first duct
112-2 second duct
112-3 third duct
113 step
114 flange
115-1 first circumferential wall
115-2 second circumferential wall
115-3 inner diameter
116 wall
117 extension
118 annular body
118a recess
119 elastic sections
120 damper
122 damper masses
124 bolt
130 transmission
132 housing
134 centering seat 136 axial gap
142 level
150 bearing shield
162 stator
163 coil winding
164 rotor
170 separating clutch
180 torsional vibration damper
190 input shaft
410 preload
411 locating faces
418 annular body sections
419 contact surfaces
A1 first angular distance
A2 second angular distance

The invention claimed is:

1. A damper arrangement for a motor vehicle drive train, the damper arrangement comprising:
    a damper (120) for damping torsional vibrations, the damper (120) having at least one duct (112-1, 112-2, 112-3); and
    a rotationally fixed fluid guide element (110),
    wherein the fluid guide element (110) is axially adjacent to the damper (120), and
    wherein a fluid (140) that at least partially surrounds the damper (120) is conveyed through the at least one duct (112-1, 112-2, 112-3) when the damper (120) rotates.

2. The damper arrangement of claim 1, wherein the fluid guide element (110) is annular.

3. The damper arrangement of claim 2, wherein the fluid guide element (110) includes an extension (117), the extension (117) at least partially projects over a circumference of the damper (120) in an axial direction.

4. The damper arrangement of claim 2, wherein each of the at least one duct (112-1, 112-2, 112-3) is a groove on a circumference of the fluid guide element (110).

5. The damper arrangement of claim 2, wherein a circumferential wall (115-1, 115-2) of each of the at least one duct (112-1, 112-2, 112-3) extends at least partially obliquely with respect to an axial direction and a circumferential direction.

6. The damper arrangement of claim 5, wherein the circumferential wall (115-1, 115-2) borders a damper-side inner diameter (115-3) of the fluid guide element (110).

7. The damper arrangement of claim 5, wherein the circumferential wall (115-1, 115-2) is at least partially concave.

8. The damper arrangement of claim 5, wherein the circumferential wall (115-1, 115-2) of each of the at least one duct (112-1, 112-2, 112-3) includes a first circumferential wall (115-1) and a second circumferential wall (115-2), opposite the first circumferential wall (115-1), the first and second circumferential walls (115-1, 115-2) extending at least partially obliquely with respect to the circumferential direction and the axial direction.

9. The damper arrangement of claim 8, wherein the first circumferential wall (115-1) extends in a concave manner and the second circumferential wall (115-2) extends in a convex manner.

10. The damper arrangement of claim 1, wherein the at least one duct comprises a first duct (112-1) and a second duct (112-2).

11. The damper arrangement of claim 10, wherein the first duct (112-1) and the second duct (112-2) are arranged at different heights along a vertical direction.

12. The damper arrangement of claim 10, wherein the first and second ducts (112-1, 112-2) are spaced apart from each other in a circumferential direction by a first angular distance (A1), the first angular distance (A1) being more than 45° and less than 100°.

13. The damper arrangement of claim 10, wherein the at least one duct further comprises a third duct (112-3), wherein the second and third ducts (112-2, 112-3) are spaced apart from each other in a circumferential direction by a second angular distance (A2), the second angular distance (A2) being more than 140° and less than 200°.

14. The damper arrangement claim 1, wherein the fluid guide element (110) has a radially inwardly directed wall (116), the radially inwardly directed wall (116) at least partially overlapping the damper (120) in an axial direction.

15. The damper arrangement of claim 1, wherein the fluid guide element (110) is at least partially comprised of an electrically non-conductive material.

16. A transmission (130) for a motor vehicle, comprising the damper arrangement of claim 1.

17. The transmission (130) of claim 16, further comprising a flange (114) arranged at a circumference of the fluid guide element (110), the flange (114) being received between two elements of the transmission (130) to secure the fluid guide element (110) within the transmission (130).

18. The transmission (130) of claim 17, wherein the two elements of the transmission (130) comprise a housing (132) and a bearing shield (150), the flange (114) being clamped between the housing (132) and the bearing shield (150).

19. The transmission (130) of claim 16, further comprising an electric machine with a stator (162) and a rotor (164), wherein the fluid guide element (110) is positioned between the damper (110) and the stator (162).

\* \* \* \* \*